United States Patent
Wiseley et al.

(10) Patent No.: US 9,027,437 B2
(45) Date of Patent: May 12, 2015

(54) STEERING WHEELS, STEERING WHEEL AND STEERING COLUMN ASSEMBLIES, AND METHODS FOR ASSEMBLING STEERING WHEELS AND STEERING COLUMNS

(75) Inventors: Gary L. Wiseley, Ann Arbor, MI (US); Peggy M. Gossiaux, Grand Blanc, MI (US); Peter J. Judis, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 259 days.

(21) Appl. No.: 13/482,138

(22) Filed: May 29, 2012

(65) Prior Publication Data

US 2013/0319170 A1 Dec. 5, 2013

(51) Int. Cl.
*G05G 1/10* (2006.01)
*B62B 1/18* (2006.01)
*B62D 1/10* (2006.01)

(52) U.S. Cl.
CPC .............. *B62D 1/10* (2013.01); *Y10T 74/20834* (2015.01); *Y10T 29/49826* (2015.01)

(58) Field of Classification Search
CPC ............ B62D 1/20; B62D 1/18; B62D 1/184; B62D 1/166; B62D 1/10; B62D 1/16; B62D 1/105; B62D 7/00
USPC ........ 74/554, 556, 484 R, 555, 492, 552, 543
See application file for complete search history.

(56) References Cited

U.S. PATENT DOCUMENTS

| | | | |
|---|---|---|---|
| 4,938,094 A | | 7/1990 | Cochard |
| 5,437,350 A | * | 8/1995 | Sallez et al. ................. 180/287 |
| 5,536,106 A | | 7/1996 | Landis et al. |
| 5,588,337 A | | 12/1996 | Milton |
| 5,855,449 A | | 1/1999 | Thomas |
| 6,634,254 B1 | | 10/2003 | Hodac |

(Continued)

FOREIGN PATENT DOCUMENTS

| | | | |
|---|---|---|---|
| DE | 3941047 A1 | 6/1990 | |
| DE | 69808238 T2 | 8/2003 | |
| EP | 0538666 A1 * | 8/1993 | ............... B62D 1/16 |

OTHER PUBLICATIONS

Machine Translation of EP 0538666.*

(Continued)

*Primary Examiner* — Marcus Charles
*Assistant Examiner* — Yamilka Pinero Medina
(74) *Attorney, Agent, or Firm* — Ingrassia Fisher & Lorenz, P.C.

(57) ABSTRACT

Steering wheels, steering wheel and steering column assemblies, and methods for assembling steering wheels and steering columns for motor vehicles are provided herein. In one example, a steering wheel comprises a hub that is disposed in a central section of the steering wheel. The hub comprises a tubular stem portion that has a channel and that comprises a wall disposed around the channel. The tubular stem portion is configured to operably couple to a steering shaft. A catch and a biasing feature are disposed along the wall and are cooperatively configured such that the biasing feature acts on the catch to allow the catch to move relative to the wall during assembly of the steering wheel to the steering shaft and urges the catch into an engaged position with the steering shaft when the steering shaft is proximate a seated position in the tubular stem portion.

20 Claims, 4 Drawing Sheets

(56) References Cited

U.S. PATENT DOCUMENTS

| | | |
|---|---|---|
| 2004/0055408 A1* | 3/2004 | Hirschfeld et al. ............ 74/492 |
| 2005/0097982 A1* | 5/2005 | Li .................................. 74/552 |
| 2007/0193315 A1 | 8/2007 | Ichikawa |
| 2012/0073401 A1 | 3/2012 | Groleau et al. |

OTHER PUBLICATIONS

German Patent and Trade Mark Office, Inquiry to Office Action in German Patent Application No. 10 2013 209 214.8, mailed Jul. 22, 2014.

German Patent and Trade Mark Office, Office Action in German Patent Application No. 10 2013 209 214.8, mailed Jul. 22, 2014.

* cited by examiner

STEERING WHEELS, STEERING WHEEL AND STEERING COLUMN ASSEMBLIES, AND METHODS FOR ASSEMBLING STEERING WHEELS AND STEERING COLUMNS

TECHNICAL FIELD

The technical field generally relates to steering wheels and steering columns for motor vehicles, and more particularly relates to steering wheels with improved attachments to steering columns for motor vehicles, steering wheel and steering column assemblies including such improved attachments, and methods for assembling steering wheels and steering column including such improved attachments.

BACKGROUND

Conventionally, a motor vehicle steering wheel has a splined bore at its center that fits over external axial splines on an upper end of a shaft of a motor vehicle steering column. The steering wheel is retained on the upper end of the shaft by a fastener, e.g. bolt or the like, that is fastened to the shaft and clamps against the center of the steering wheel hub. If the fastener is missing, the steering wheel can be pulled off of the shaft.

Accordingly, it is desirable to provide a steering wheel with an improved attachment to a steering column, a steering wheel and steering column assembly including such an improved attachment, and a method for assembling a steering wheel and a steering column including such an improved attachment. Furthermore, other desirable features and characteristics of the present invention will become apparent from the subsequent detailed description and the appended claims, taken in conjunction with the accompanying drawings and the foregoing technical field and background.

SUMMARY

A steering wheel for a motor vehicle is provided herein. In one embodiment, the steering wheel comprises a hub that is disposed in a central section of the steering wheel. The hub comprises a tubular stem portion that has a channel and that comprises a wall disposed around the channel. The tubular stem portion is configured to operably couple to a steering shaft. A catch and a biasing feature are disposed along the wall and are cooperatively configured such that the biasing feature acts on the catch to allow the catch to move relative to the wall during assembly of the steering wheel to the steering shaft and urges the catch into an engaged position with the steering shaft when the steering shaft is proximate a seated position in the tubular stem portion to prevent the steering wheel from being removed from the steering shaft.

A steering wheel and steering column assembly for a motor vehicle is provided herein. In one embodiment, the assembly comprises a steering shaft that has an attachment end portion with a plurality of external splines. A steering wheel comprises a hub that is disposed in a central section of the steering wheel. The hub comprises a tubular stem portion that has a channel and that comprises a wall disposed around the channel. The wall has an inner surface and a plurality of internal splines formed along the inner surface engageable with the external splines for operably coupling the steering wheel to the steering shaft. A catch and a biasing feature are disposed along the wall and are cooperatively configured such that the biasing feature acts on the catch to allow the catch to move relative to the wall during assembly of the steering wheel to the steering shaft and urges the catch into an engaged position with the attachment end portion when the steering shaft is proximate a seated position in the tubular stem portion to prevent the steering wheel from being removed from the steering shaft.

A method of assembling a steering wheel and a steering column for a motor vehicle is provided herein. In one embodiment, the method comprises the steps of advancing an attachment end portion of a steering shaft to a seated position in a channel of a tubular stem portion of a hub of the steering wheel. A catch of the steering wheel disposed along a wall of the tubular stem portion is urged into an engaged position with the attachment end portion using a biasing feature to prevent the steering wheel from being removed from the steering shaft.

DESCRIPTION OF THE DRAWINGS

The embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Various embodiments contemplated herein relate to steering wheels, steering wheel and steering column assemblies, and methods for assembling steering wheels and steering columns. Unlike the prior art, the embodiments taught herein provide a steering wheel comprising a hub that is disposed in a central section of the steering wheel. The hub comprises a tubular stem portion that is configured to operably couple to a steering shaft. In an embodiment, the steering shaft has an attachment end portion that includes a plurality of external splines. The tubular stem portion of the steering wheel has a channel and comprises a wall that is disposed around the channel. The wall has an inner surface and a plurality of internal splines formed along the inner surface engageable with the external splines of the attachment end portion for operably coupling the steering wheel to the steering shaft.

The steering wheel comprises a catch and a biasing feature that are disposed along the wall of the tubular stem portion. The catch and the biasing feature are cooperatively configured such that the biasing feature acts on the catch to allow the catch to move relative to the wall of the tubular stem portion during assembly of the steering wheel to the steering shaft and urges the catch into an engaged position with the attachment end portion of the steering shaft when the steering shaft is proximate a seated position in the tubular stem portion. With the catch in the engaged position with the attachment end portion of the steering shaft, axial movement of the steering wheel along the steering shaft is limited or substantially prevented.

In an embodiment, the attachment end portion of the steering shaft is tubular and has a shaft end channel and comprises a shaft end wall that is disposed around the shaft end channel. The shaft end wall has an inner shaft end surface. The shaft end channel and the inner shaft end surface are cooperatively configured to engageably receive a fastener to secure the steering wheel to the steering shaft. In the event that the fastener is not properly torqued down or is missing, the catch in the engaged position with the attachment end portion of the steering shaft prevents the steering wheel from being removed from the steering shaft.

Figure 1:
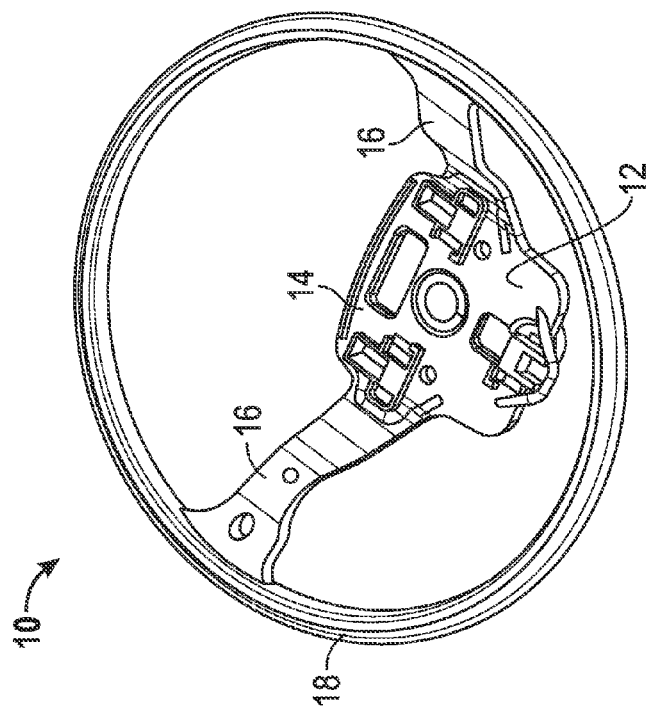
FIG. 1 is a perspective view of a steering wheel including a hub in accordance with an embodiment.

Referring to FIG. 1, a perspective view of a steering wheel 10 in accordance with an embodiment is provided. The steering wheel 10 comprises a hub 12 disposed in a central section 14 of the steering wheel 10. A plurality of spokes 16 extend substantially radially outward from the hub 12. As illustrated, an outer rim 18 that is generally circular is supported by the spokes 16. The hub 12, the spokes 16, and the outer rim 18 together form an integral steering wheel frame that may be partially or completely covered, for example, with a foam covering, decorative covering, and/or the like.

Figure 2:
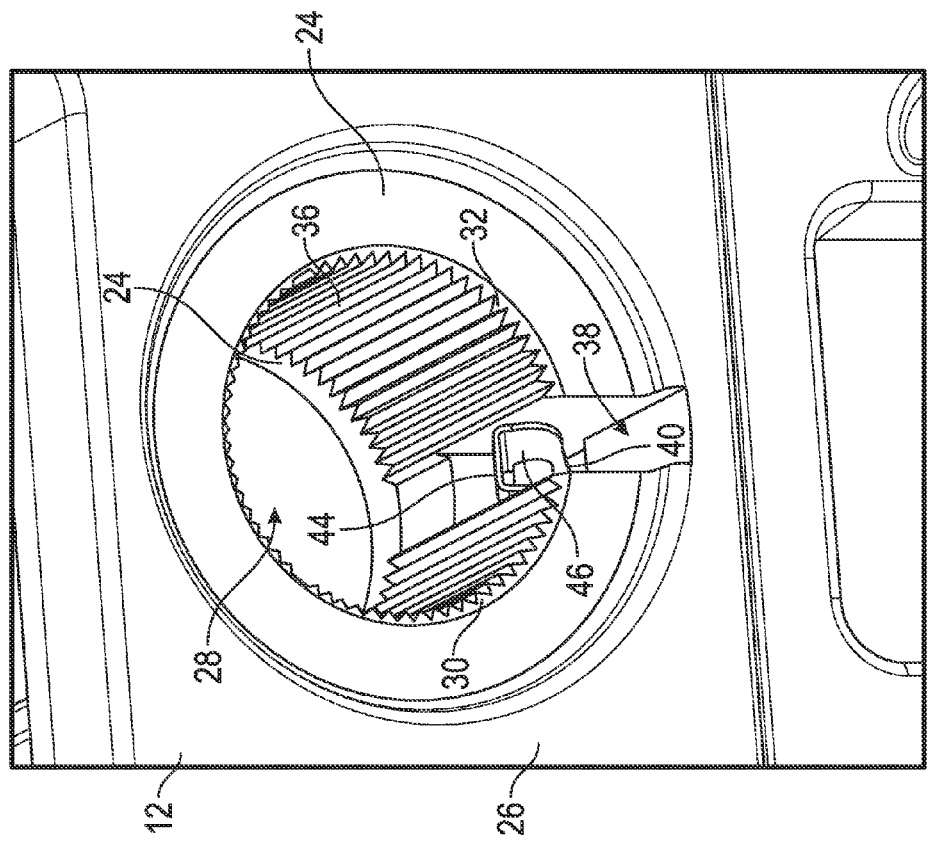
FIG. 2 is an enlarged partial perspective front view of the hub depicted in FIG. 1 in accordance with an embodiment.
Figure 4:
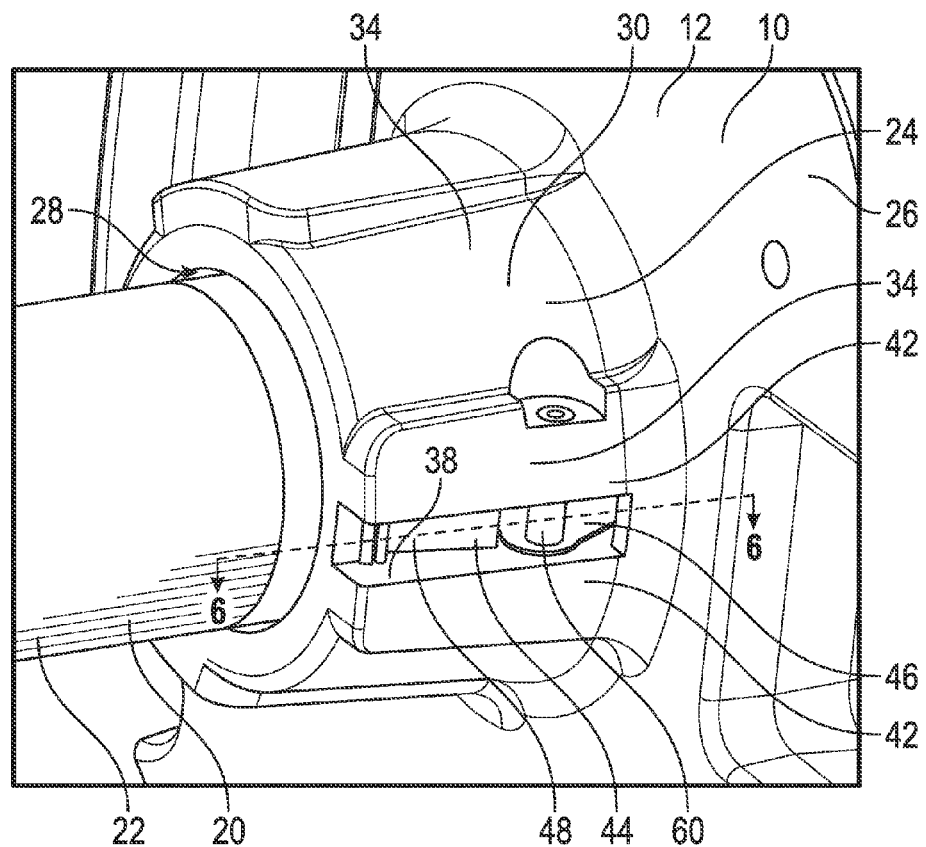
FIG. 4 is an enlarged partial perspective rear view of a steering wheel and steering column assembly in accordance with an embodiment.

Referring to FIGS. 2 and 4, in accordance with an embodiment, a partial perspective front view of the hub 12 and a partial perspective rear view of the hub 12 and a steering shaft 20 of a steering column 22, respectively, are provided. The hub 12 comprises a tubular stem portion 24 and a plate portion 26 that extends radially outward from the tubular stem portion 24. The tubular stem portion 24 has a channel 28 and a wall 30 that is arranged around the channel 28. The wall 30 has an inner surface 32 that is adjacent to the channel 28 and an outer surface 34 that is disposed opposite the channel 28 and the inner surface 32. The inner surface 32 has a plurality of internal splines 36. As illustrated, the internal splines 36 are configured, for example, as trapezoidal axial splines.

In an embodiment, a slot 38 is formed along the inner and outer surfaces 32 and 34 and through the wall 30 to define an opening 40. As illustrated, the slot 38 is formed in a locally thickened section 42 of the wall 30 and extends axially from the outer surface 34 through the wall 30 to the inner surface 32.

Figure 3:
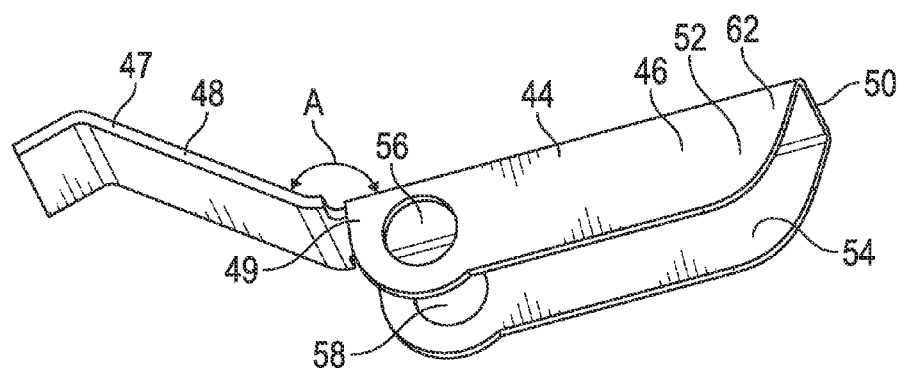
FIG. 3 is a perspective side view of a spring loaded catch in accordance with an embodiment.

Referring also to FIG. 3, in accordance with an embodiment, a spring loaded catch 44 is disposed along the wall 30 and in the slot 38. The spring loaded catch 44 comprises a catch 46 and a biasing feature 48. The catch 46 and the biasing feature 48 are cooperatively configured such that the biasing feature 48 acts on the catch 46 to influence movement of the catch 46 relative to the wall 30. In one embodiment, the biasing feature 48 is positioned adjacent to the outer surface 34 of the wall 30 and the catch 46 is positioned through the opening 40 and adjacent to both the inner and outer surfaces 32 and 34 of the wall 30. The biasing feature 48 under load acts against the outer surface 34 and applies a spring force to an end portion 49 of the catch 46 to urge a distal-most end portion 62 of the catch 46 to move relative to the wall 30 in response to the spring force while allowing the distal-most end portion 62 to move resistively against the spring force. As illustrated, the catch 46 and the biasing feature 48 are integrally formed, e.g., from spring steel or the like, to define the spring loaded catch 44. Alternatively, the catch 46 and the biasing feature 48 may be separate components but arranged such that the biasing feature 48 acts upon the catch 46 to move the catch 46 relative to the wall 30.

In an embodiment, the biasing feature 48 is configured as a cantilever spring that is pivotally connected to the end portion 49 of the catch 46. As illustrated, the biasing feature 48 is a bent strip 47 that extends from the end portion 49 of the catch 46. In one embodiment, the bent strip 47 extends from the catch 46 at an angle A of from about 120 to about 160 degrees.

In an embodiment, the catch 46 is configured as a lever having a "U-shaped" cross-section and comprising a web strip 50 extending between sidewall strips 52 and 54. The sidewall strips 52 and 54 each have an attachment opening 56 or 58, respectively. The attachment openings 56 and 58 are formed through the sidewall strips 52 and 54 such that the attachment openings 56 and 58 are aligned with each other. A pin 60 (shown in FIG. 4), e.g., a rolled steel pin or the like, extends laterally through the locally thickened section 42 of the wall 30, across the slot 38, and through the attachment openings 56 and 58. As such, the catch 46 is coupled to the tubular stem portion 24 and can move relative to the wall 30 under the influence of the biasing feature 48 by rotating about the pin 60.

Figure 5:
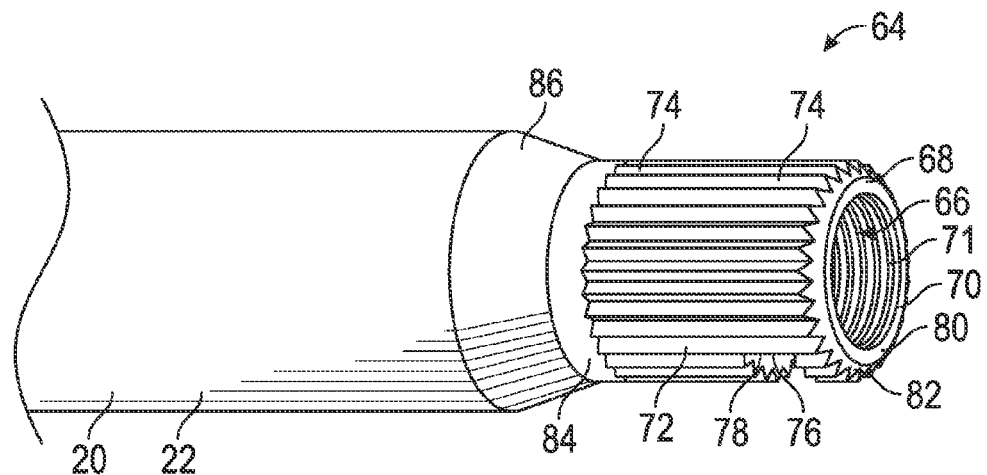
FIG. 5 is a partial perspective side view of a steering shaft in accordance with an embodiment.

Referring to FIGS. 4 and 5, in an embodiment, during assembly of the steering wheel 10 to the steering column 22, an attachment end portion 64 of the steering shaft 20 is advanced into the channel 28 of the tubular stem portion 24 of the hub 12. As illustrated in FIG. 5, the attachment end portion 64 is tubular and has a shaft end channel 66 and comprises a shaft end wall 68 that is disposed around the shaft end channel 66. The shaft end wall 68 has an inner shaft end surface 70 and an outer shaft end surface 72. A plurality of external splines 74, e.g., trapezoidal axial splines, are formed along the outer shaft end surface 72, and thread(s) 71 are formed along the inner shaft end surface 70. The shaft end wall 68 defines a negative feature 76. In an embodiment, the negative feature 76 is a shaft end opening 78 that is formed through the shaft end wall 68 extending from the inner shaft end surface 70 to the outer shaft end surface 72. At a distal end portion 80 and a proximal end portion 84 of the attachment end portion 64 are beveled surfaces 82 and 86, respectively.

Figure 6A:
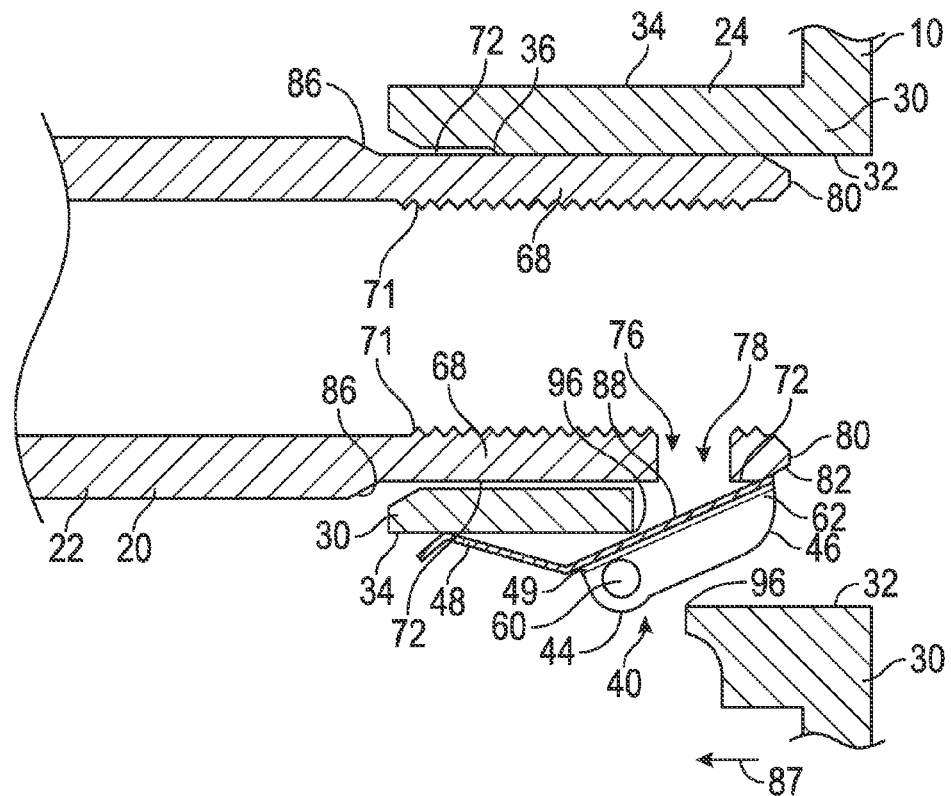
FIG. 6A is a sectional view of the steering wheel and steering column assembly depicted in FIG. 4 along line 6-6 during an intermediate assembly stage in accordance with an embodiment.

Referring to FIG. 6A, a sectional view of the steering wheel 10 and steering column 22 depicted in FIG. 4 along line 6-6 during an intermediate assembly stage in accordance with an embodiment is provided. As illustrated, the tubular stem portion 24 of the steering wheel 10 is advanced over the attachment end portion 64 of the steering shaft 20 in an axial direction indicated by single headed arrow 87. In particular, the inner surface 32 of the tubular stem portion 24 advances over the outer shaft end surface 72 of the attachment end portion 64 such that the internal splines 36 (see also FIG. 2) of the steering wheel 10 engage the external splines 74 (see FIG. 5) of the steering shaft 20. As such, the steering wheel 10 is operably coupled to the steering shaft 20 to transmit rotational motion from the steering wheel 10 to the steering shaft 20.

As the tubular stem portion 24 is being advanced over the attachment end portion 64, a contact surface 88 of the catch 46 contacts the outer shaft end surface 72. The biasing feature 48 and the pin 60 cooperate to allow the catch 46 to rotate so that the catch 46 can ride along the outer shaft end surface 72. As illustrated, an opening perimeter portion 96 of the wall 30, which defines the opening 40, limits the rotation of the catch 46. In an embodiment, when the contact surface 88 of the catch 46 contacts the beveled surface 82, the beveled surface 82 helps to move the distal-most end portion 62 of the catch 46 out of the way of the advancing distal end portion 80 of the steering shaft 20 to facilitate the assembly process.

Figure 6B:
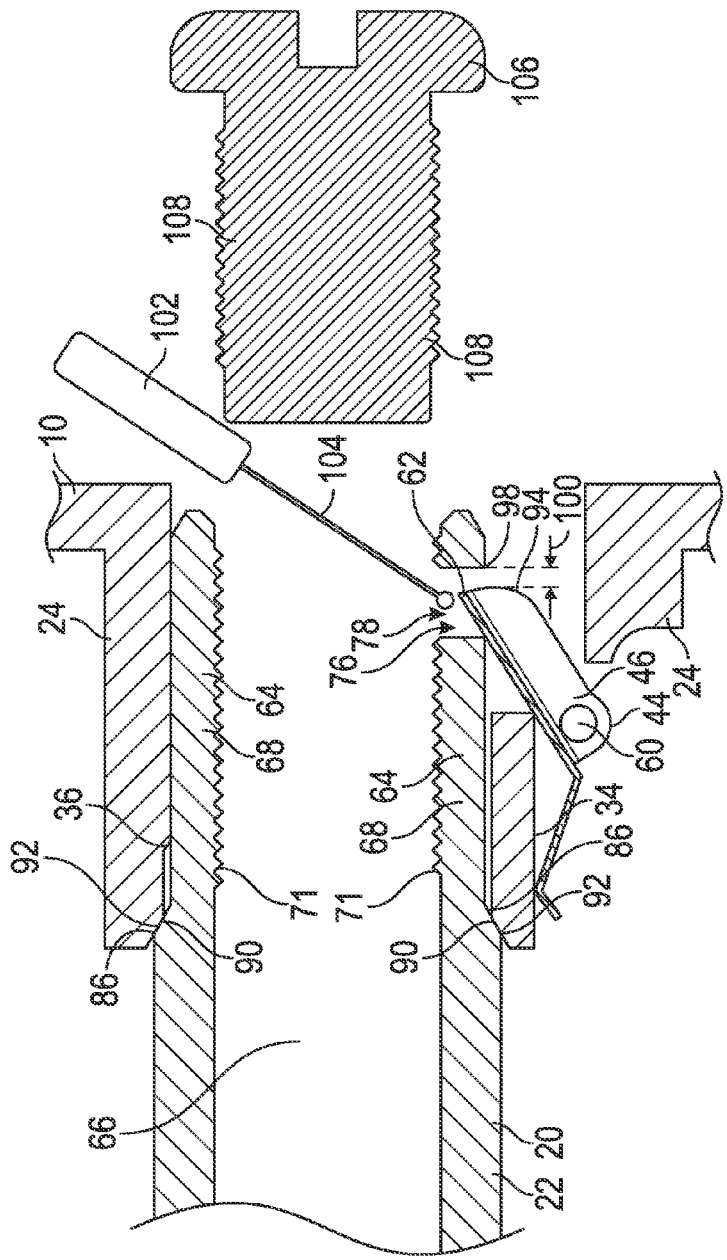
FIG. 6B is a sectional view of the steering wheel and steering column assembly depicted in FIG. 4 along line 6-6 during a later intermediate assembly stage in accordance with an embodiment.

Referring to FIG. 6B, a sectional view of the steering wheel 10 and steering column 22 depicted in FIG. 4 along line 6-6 during a later intermediate assembly stage in accordance with an embodiment is provided. The tubular stem portion 24 and the attachment end portion 64 are moved together axially until the steering shaft 20 is in a seated position 90 with the tubular stem portion 24. As illustrated, in the seated position 90, the beveled surface 86 of the steering shaft 20 abuts an inclined stop surface 92 of the tubular stem portion 24. When the steering shaft 20 is proximate (e.g., in or near) the seated position 90, the biasing feature 48 acting against the outer surface 34 of the tubular stem portion 24 urges the catch 46 into an engaged position 94 with the steering shaft 20 to prevent the steering wheel 10 from being removed from the steering shaft 20. In one example and as illustrated, the biasing feature 48 urges the catch 46 into the negative feature 76, e.g., shaft end opening 78, once the distal-most end portion 62 clears an edge 98 of the shaft end wall 68. In an embodiment, the negative feature 76 is configured to have a 1 to 4 millimeter (mm) gap 100 (indicated by single headed arrows) with the catch 46 in the engaged position 94 to allow limited axial movement of the steering wheel 10 along the steering shaft 20. As such, the steering wheel 10 may be wiggled back and forth, e.g., a distance that corresponds to the gap 100, along the steering shaft 20 without being removed from the steering shaft 20.

In an embodiment, the steering wheel 10 can be removed from the steering shaft 20, such as for maintenance and/or repair reasons, by disengaging the catch 46 from the steering shaft 20. In one example, a tool 102 having an elongated member 104, e.g., a screwdriver, is advanced through the shaft end channel 66 into the shaft end opening 78. Next, the elongated member 104 is used to push the distal-most end portion 62 out of the shaft end opening 78. As such, the steering wheel 10 can then be removed from the steering shaft 20.

As illustrated, a fastener 106 having external thread(s) 108 is advanced into the shaft end channel 66 and torqued, e.g., rotated, into position such that the external thread(s) 108 are engaged with the threads(s) 71 of the attachment end portion 64 to secure the steering wheel 10 to the steering shaft 20. In an embodiment, the distal-most end portion 62 of the catch 46 in the engaged position 94 is disposed outside of the shaft end channel 66 so that it does not obstruct fastening of the fastener 106 with the attachment end portion 64. If the fastener 106 is not torqued down properly or is missing, the catch 46 in the engaged position 94 with the attachment end portion 64 prevents the steering wheel 10 from being removed from the steering shaft 20. In this scenario and as discussed in an embodiment above, the steering wheel 10 can be wiggled back and forth along the steering shaft 20 without being removed from the steering shaft 20. Allowing the steering wheel 10 to be wiggled in such a manner is intended to safely provide a motor vehicle operator or technician an indication that the attachment between the steering wheel 10 and the steering shaft 20 should be inspected.

Figure 7:
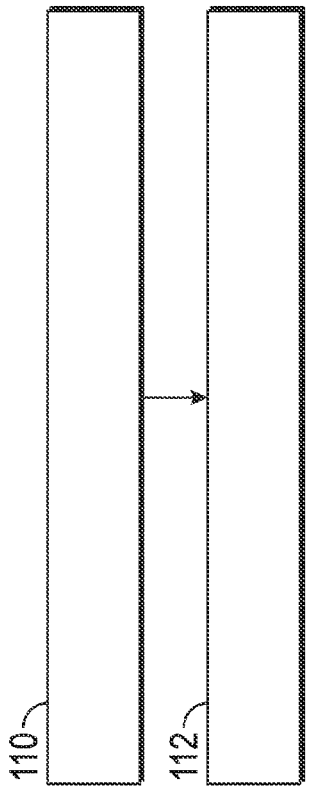
FIG. 7 is a flowchart of the method for assembling a steering wheel and a steering column in accordance with an embodiment.

Referring to FIG. 7, a flowchart of the method for assembling a steering wheel and a steering column in accordance with an exemplary embodiment is provided. The method comprises advancing (step 110) an attachment end portion of a steering shaft to a seated position in a channel of a tubular stem portion of a hub of the steering wheel. A catch of the steering wheel disposed along a wall of the tubular stem portion is urged (step 112) into an engaged position with the attachment end portion using a biasing feature to prevent the steering wheel from being removed from the steering shaft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A steering wheel for a motor vehicle, the steering wheel comprising:
   a hub disposed in a central section of the steering wheel and comprising a tubular stem portion that has a channel and that comprises a wall disposed around the channel, wherein the tubular stem portion is configured to operably couple to a steering shaft, wherein the tubular stem portion has a locally thickened section of the wall;
   a catch and a biasing feature disposed along the wall and cooperatively configured such that the biasing feature acts on the catch to allow the catch to move relative to the wall during assembly of the steering wheel to the steering shaft and urges the catch into an engaged position with the steering shaft when the steering shaft is proximate a seated position in the tubular stem portion to prevent the steering wheel from being removed from the steering shaft, wherein the catch has at least one attachment opening formed therethrough; and
   a pin that extends through the locally thickened section of the wall and the at least one attachment opening to rotationally couple the catch to the tubular stem portion of the steering wheel.

2. The steering wheel of claim 1, wherein the catch and the biasing feature are integrally formed defining a spring loaded catch.

3. The steering wheel of claim 1, wherein the biasing feature is configured as a cantilever spring that is pivotally connected to the catch.

4. The steering wheel of claim 3, wherein the cantilever spring extends from the catch at an angle of from 120 to 160 degrees.

5. The steering wheel of claim 1, wherein the catch is configured as a lever having a "U-shaped" cross-section and comprising a web strip extending between two sidewall strips.

6. The steering wheel of claim 5, wherein the two sidewall strips each have an attachment opening formed therethrough, and wherein the attachment openings are aligned with each other and the steering wheel, and wherein the pin extends through the attachment openings and the locally thickened section of the wall to rotationally couple the catch to the tubular stem portion.

7. The steering wheel of claim 1, wherein the wall has an inner surface, an outer surface, and a slot that is formed along the inner and outer surfaces and through the wall to define an opening, and wherein the catch and the biasing feature are disposed along the slot.

8. The steering wheel of claim 7, wherein the biasing feature is positioned in the slot adjacent to the outer surface of the wall such that the biasing feature acts against the outer surface to allow the catch to move relative to the wall and to urge the catch into the engaged position.

9. The steering wheel of claim 7, wherein the catch is positioned in the slot through the opening such that the catch is adjacent to both the inner and outer surfaces of the wall.

10. The steering wheel of claim 9, wherein the wall has an opening perimeter portion that defines the opening, and wherein the opening perimeter portion limits relative movement between the catch and the wall.

11. A steering wheel and steering column assembly for a motor vehicle, the assembly comprising:
   a steering shaft having an attachment end portion that has a plurality of external splines; and
   a steering wheel comprising:
      a hub disposed in a central section of the steering wheel and comprising a tubular stem portion that has a channel and that comprises a wall disposed around the channel, wherein the wall has an inner surface and a plurality of internal splines formed along the inner surface engageable with the external splines for operably coupling the steering wheel to the steering shaft, wherein the tubular stem portion has a locally thickened section of the wall;
      a catch and a biasing feature disposed along the wall and cooperatively configured such that the biasing feature acts on the catch to allow the catch to move relative to the wall during assembly of the steering wheel to the steering shaft and urges the catch into an engaged position with the attachment end portion when the steering shaft is proximate a seated position in the tubular stem portion to prevent the steering wheel from being removed from the steering shaft, wherein the catch has at least one attachment opening formed therethrough; and
      a pin that extends through the locally thickened section of the wall and the at least one attachment opening to rotationally couple the catch to the tubular stem portion of the steering wheel.

12. The assembly of claim 11, wherein the attachment end portion has a negative feature and the catch in the engaged position is positioned in the negative feature to prevent the steering wheel from being removed from the steering shaft.

13. The assembly of claim 12, wherein the negative feature is configured to have a 1 to 4 mm gap with the catch in the engaged position to allow limited axial movement of the steering wheel along the steering shaft.

14. The assembly of claim 12, wherein the attachment end portion of the steering shaft is tubular and has a shaft end channel and comprises a shaft end wall that is disposed around the shaft end channel, wherein the shaft end wall has an inner shaft end surface and an outer shaft end surface, and wherein the external splines are formed along the outer shaft end surface.

15. The assembly of claim 14, further comprising a fastener, and wherein the shaft end channel and the inner shaft end surface are cooperatively configured to engageably receive the fastener to secure the steering wheel to the steering shaft.

16. The assembly of claim 14, wherein the shaft end wall has a shaft end opening formed therethrough that defines the negative feature.

17. The assembly of claim 16, wherein the catch has a distal-most end portion and in the engaged position the distal-most end portion is disposed in the shaft end opening outside of the shaft end channel.

18. The assembly of claim 16, wherein the attachment end portion, the catch, and the biasing feature are cooperatively configured to allow the catch to be move out of the engaged position to permit the steering wheel to be removed from the steering shaft by advancing a tool through the shaft end channel into the shaft end opening to move the catch out of the shaft end opening.

19. The assembly of claim 11, wherein the attachment end portion has a beveled surface to facilitate moving the catch over the attachment end portion during assembly of the steering wheel to the steering shaft.

20. A method for assembling a steering wheel and a steering column, the method comprising the steps of:
   advancing an attachment end portion of a steering shaft to a seated position in a channel of a tubular stem portion of a hub of the steering wheel, wherein the tubular stem portion has a locally thickened section of a wall that is disposed around the channel; and
   urging a catch of the steering wheel disposed along the wall of the tubular stem portion into an engaged position with the attachment end portion using a biasing feature to prevent the steering wheel from being removed from the steering shaft, wherein urging comprises rotating the catch about a pin that extends through the locally thickened section of the wall and at least one attachment opening formed through the catch and that rotationally couples the catch to the tubular stem portion of the steering wheel.

* * * * *